No. 747,944. PATENTED DEC. 29, 1903.
N. W. CONDICT.
AMMONIA STILL.
APPLICATION FILED OCT. 25, 1902.
NO MODEL.
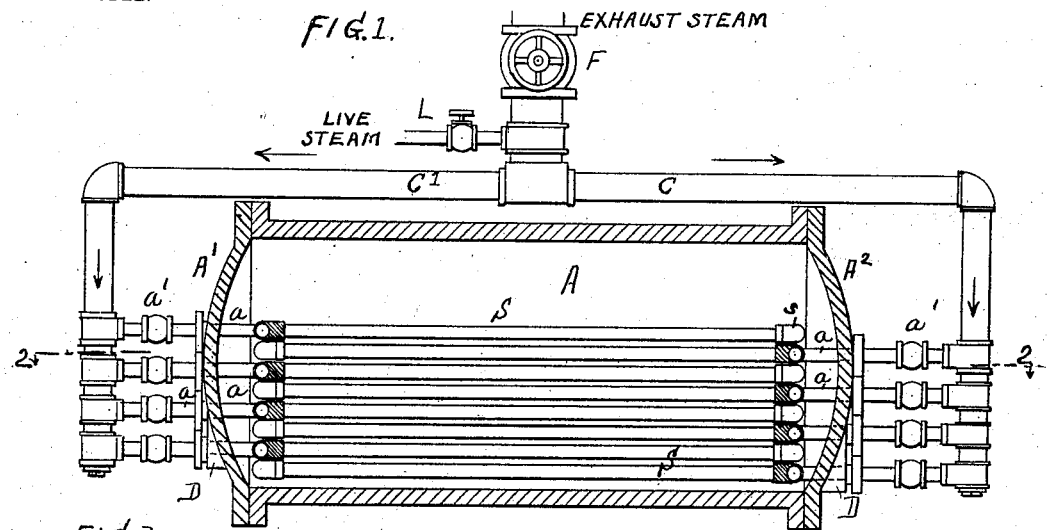
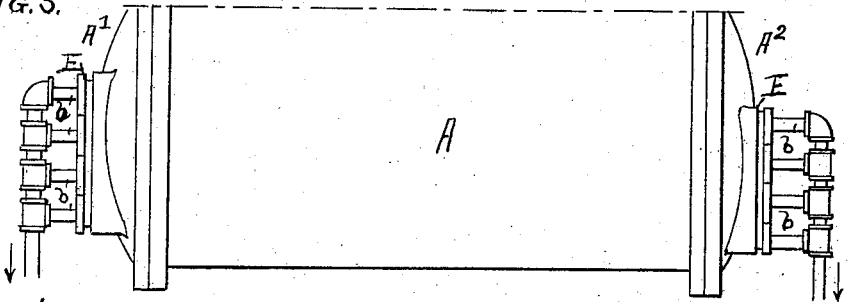
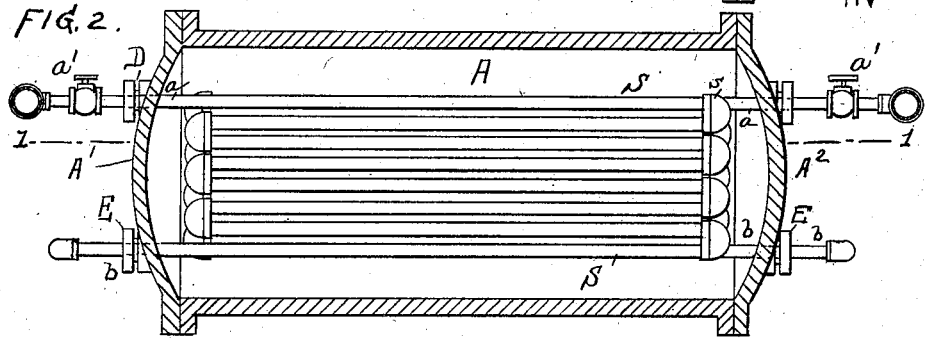
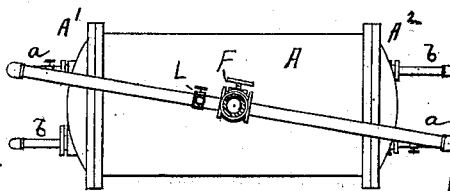
WITNESSES:
G. W. Wright
E. W. Collins
INVENTOR
NATHAN W. CONDICT
BY
Howson and Howson
ATTORNEYS No. 747,944. Patented December 29, 1903.

UNITED STATES PATENT OFFICE.

NATHAN W. CONDICT, OF JERSEY CITY, NEW JERSEY.

AMMONIA-STILL.

SPECIFICATION forming part of Letters Patent No. 747,944, dated December 29, 1903.

Application filed October 25, 1902. Serial No. 128,776. (No model.)

*To all whom it may concern:*

Be it known that I, NATHAN W. CONDICT, a citizen of the United States of America, and a resident of Jersey City, in the county of Hudson, State of New Jersey, have invented Improvements in Ammonia-Stills, of which the following is a specification.

My invention relates to that class of refrigerating apparatus which works by the ammonia or absorption process; and the main object of my invention is to so construct the still of such an apparatus that it can be properly heated for the efficient operation of generating the gas by the employment of either live or exhaust steam, or both, as the heating medium, according to the principles set forth in my Patent No. 706,901, dated August 12, 1902.

In the accompanying drawings, Figure 1 is a vertical section of my improved still on the line 1 1, Fig. 2. Fig. 2 is a sectional plan on the line 2 2, Fig. 1. Fig. 3 is a side elevation of the lower part of the still to show the outlets, and Fig. 4 is a plan view of a modification.

The still proper or generating-chamber is in the form of a horizontal cylinder A, through the heads A' A² of which pass the pipes to the heating-coils S. These coils are serpentine in form and may be made of bent piping, as in the case illustrated in my above-mentioned Patent No. 706,901, or, as shown in this case, they may be made of straight pipes with return-bend couplings s. In any case they are arranged in a number of horizontal superposed layers S, as shown best in Fig. 1, with their inlet ends a, Figs. 1 and 2, passing through stuffing-boxes D and their outlet ends b passing through stuffing-boxes E, Figs. 2 and 3.

As will be seen, each coil has its inlet and outlet at the same end of the still, but toward opposite sides thereof, and the successive coils or layers pass out at opposite ends of the still alternately. Thus in Fig. 1 the top layer has its inlet and outlet at the left-hand end, while the next layer from the top has its inlet and outlet at the right-hand end of the still, and so on alternately with the successive layers. By this means I am able to crowd into a given space in the still a larger number of layers or coils, and therefore I get a larger total heating-surface than if all the successive coils or layers had their inlets and outlets at the same end of the still, for of course the superposed stuffing-boxes demand a certain amount of space and cannot be put as close to each other as the coils.

As shown in Figs. 1, 2, and 3, the inlets, which are at opposite ends of the still, may be on the same side of the still and the outlets at the other side, or the inlets (and likewise the outlets) may be arranged diagonally, as illustrated in Fig. 4.

F is the valved pipe for the supply of exhaust-steam for heating. L is the valved pipe for the live-steam supply. Both these pipes open into branch pipes C C', leading to the opposite ends of the still, for connection with the inlets of all the coils through the hand-controlled valves a'.

I claim as my invention—

In an ammonia-still for refrigerating apparatus, the combination of the horizontal cylinder of the still with steam-coils in horizontal superposed layers, each layer having its inlet and outlet pipes at the same end but toward different sides of the cylinder, stuffing-boxes in the cylinder ends through which such inlet and outlet pipes pass, and the pipes of the successive layers passing out at opposite ends of the cylinder alternately, substantially as and for the purpose set forth.

In testimony whereof I have signed my name to this specification in the presence of two subscribing witnesses.

NATHAN W. CONDICT.

Witnesses:
F. WARREN WRIGHT,
HUBERT HOWSON.